United States Patent
Noguchi et al.

(10) Patent No.: US 11,242,034 B2
(45) Date of Patent: Feb. 8, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Junpei Noguchi, Wako (JP); Chie Sugihara, Tokyo (JP); Yuta Takada, Tokyo (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/869,634

(22) Filed: May 8, 2020

(65) Prior Publication Data

US 2020/0361414 A1    Nov. 19, 2020

(30) Foreign Application Priority Data

May 16, 2019    (JP) .............................. JP2019-092822

(51) Int. Cl.
*B60R 25/24*    (2013.01)
*B60R 25/20*    (2013.01)
*B60W 30/06*    (2006.01)

(52) U.S. Cl.
CPC ........ *B60R 25/241* (2013.01); *B60R 25/2018* (2013.01); *B60R 25/248* (2013.01); *B60W 30/06* (2013.01)

(58) Field of Classification Search
None
See application file for complete search history.

(56) References Cited

U.S. PATENT DOCUMENTS

| | | | |
|---|---|---|---|
| 9,365,188 B1 * | 6/2016 | Penilla | G06Q 10/02 |
| 9,557,741 B1 * | 1/2017 | Elie | G05D 1/0088 |
| 2009/0146846 A1 * | 6/2009 | Grossman | B60R 25/33 340/988 |
| 2018/0052459 A1 * | 2/2018 | Kurt | B60W 30/06 |
| 2018/0052460 A1 * | 2/2018 | Kurt | G08G 1/143 |
| 2019/0143940 A1 * | 5/2019 | Inami | B60R 25/241 340/5.61 |
| 2020/0079322 A1 * | 3/2020 | Crocker | G07C 9/29 |
| 2020/0346553 A1 * | 11/2020 | Grimm | B60L 53/66 |
| 2020/0388155 A1 * | 12/2020 | Mukaiyama | G06Q 10/02 |
| 2020/0406887 A1 * | 12/2020 | Khurewattanakul | G08G 1/146 |
| 2021/0114557 A1 * | 4/2021 | Arakawa | B60R 25/241 |

FOREIGN PATENT DOCUMENTS

| | | | | |
|---|---|---|---|---|
| DE | 102014006048 A1 * | 9/2014 | .......... | B60R 25/102 |
| JP | 2015-075899 | 4/2015 | | |
| KR | 101777340 B1 * | 9/2017 | .......... | B60R 25/252 |

\* cited by examiner

*Primary Examiner* — Fekadeselassie Girma
(74) *Attorney, Agent, or Firm* — Amin, Turocy & Watson, LLP

(57) ABSTRACT

A vehicle control device includes a processor a memory storing program instructions executable by the processor to transmit a virtual key enabling an operation on a vehicle through automated valet parking control to another device by using a communicator communicating with the other device; and an operation controller configured to operate the vehicle according to operation information of the vehicle in a case where the communicator receives use information of the virtual key.

8 Claims, 9 Drawing Sheets

VEHICLE CONTROL DEVICE, VEHICLE CONTROL METHOD, AND STORAGE MEDIUM

CROSS-REFERENCE TO RELATED APPLICATION

This application claims priority to and the benefit from Japanese Patent Application No. 2019-092822, filed on May 16, 2019, the contents of which are hereby incorporated by reference into the present application.

BACKGROUND OF THE INVENTION

Field of the Invention

The present invention relates to a vehicle control device, a vehicle control method, and a storage medium.

Description of Related Art

In recent years, studies of automated vehicle control have been conducted. As a technology using this control, for example, there is a parking support system that determines whether a vehicle disposed at an entrance or an entering position of a parking facility can be parked in a parking position space in the parking facility (for example, Japanese Unexamined Patent Application, First Publication No. 2015-75899: hereinafter referred to as Patent Document 1).

SUMMARY

In the technology disclosed in Patent Document 1, a vehicle is controlled until the vehicle comes into the parking facility and then enters the entering position. However, when a certain inconvenience occurs, it has not been considered that a provisional authority be temporarily set. Therefore, inconvenience may not be eliminated in some cases.

The present invention is devised in view of such circumstances and an objective of the present invention is to provide a vehicle control device, a vehicle control method, and a storage medium capable of solving inconvenience occurring in a parking facility or a vehicle by setting a provisional authority.

A vehicle control device, a vehicle control method, and a storage medium according to the present invention adopt the following configurations.

(1) According to an aspect of the present invention, a vehicle control device includes a processor; and a memory storing program instructions executable by the processor to: transmit a virtual key enabling an operation on a vehicle through automated valet parking control to another device by using a communicator for communicating with the other device; and operate the vehicle according to operation information of the vehicle in a case where the communicator receives use information of the virtual key.

(2) In the vehicle control device according to the aspect (1), the operation on the vehicle may include an operation of giving an instruction to activate a system of the vehicle and to cause the vehicle to travel.

(3) In the vehicle control device according to the aspect (1) or (2), transmitting the virtual key comprises transmitting the virtual key to the other device after the vehicle enters a parking facility, and until a user of the vehicle alights from the vehicle.

(4) In the vehicle control device according to any one of the aspects (1) to (3), the program instructions are further executable by the processor to: invalidate the virtual key in a case where the vehicle leaves the parking facility.

(5) In the vehicle control device according to any one of the aspects (1) to (4), the program instructions are further executable by the processor to: invalidate the virtual key in a case where the vehicle parked in a parking space in the parking facility exits from the parking space according to a return instruction from a user of the vehicle.

(6) In the vehicle control device according to any one of the aspects (1) to (5), the program instructions are further executable by the processor to: invalidate the virtual key in a case where the vehicle deviates from a communicable range of a communication device provided in the parking facility.

(7) In the vehicle control device according to any one of the aspects (1) to (6), the program instructions are further executable by the processor to: adjust an operation of the vehicle according to a communication strength between the communicator and the other device.

(8) In the vehicle control device according to the aspect (7), the program instructions are further executable by the processor to: cause the vehicle to perform a first operation on the vehicle in a case where the communication strength is equal to or greater than a first strength; cause the vehicle to perform a second operation in which a control degree is lower than in the first operation in a case where the communication strength is less than the first strength and equal to or greater than a second strength; and cause the vehicle to stop in a case where the communication strength is less than the second strength.

(9) In the vehicle control device according to any one of the aspects (1) to (8), the operation on the vehicle includes an operation of giving an instruction to unlock a door of the vehicle according to permission of the user.

(10) According to another aspect of the present invention, there is provided a vehicle control method using a computer includes: transmitting a virtual key enabling an operation on a vehicle through automated valet parking control to another device by using a communicator communicating with the other device; and operating the vehicle according to operation information of the vehicle when the communicator receives use information of the virtual key.

(11) According to still another aspect of the present invention, a computer-readable non-transitory storage medium stores a program causing a computer to perform: transmitting a virtual key enabling an operation on a vehicle through automated valet parking control to another device by using a communicator communicating with the other device; and operating the vehicle according to operation information of the vehicle when the communicator receives use information of the virtual key.

According to the aspects (1) to (11), by setting the provisional authority, it is possible to solve inconvenience occurring in a parking facility or a vehicle.

According to the aspect (3), it is possible to inhibit erroneous transmission of a virtual key.

According to the aspects (4) to (6), it is possible to inhibit an excessive operation by another device.

According to the aspects (7) and (8), it is possible to inhibit an erroneous operation by another device.

According to the aspect (9), it is possible to inhibit excessive intervention by another device.

DETAILED DESCRIPTION OF THE INVENTION

Hereinafter, embodiments of a vehicle control device, a vehicle control method, and a storage medium according to the present invention will be described with reference to the drawings.

[Overall Configuration]

Figure 1:
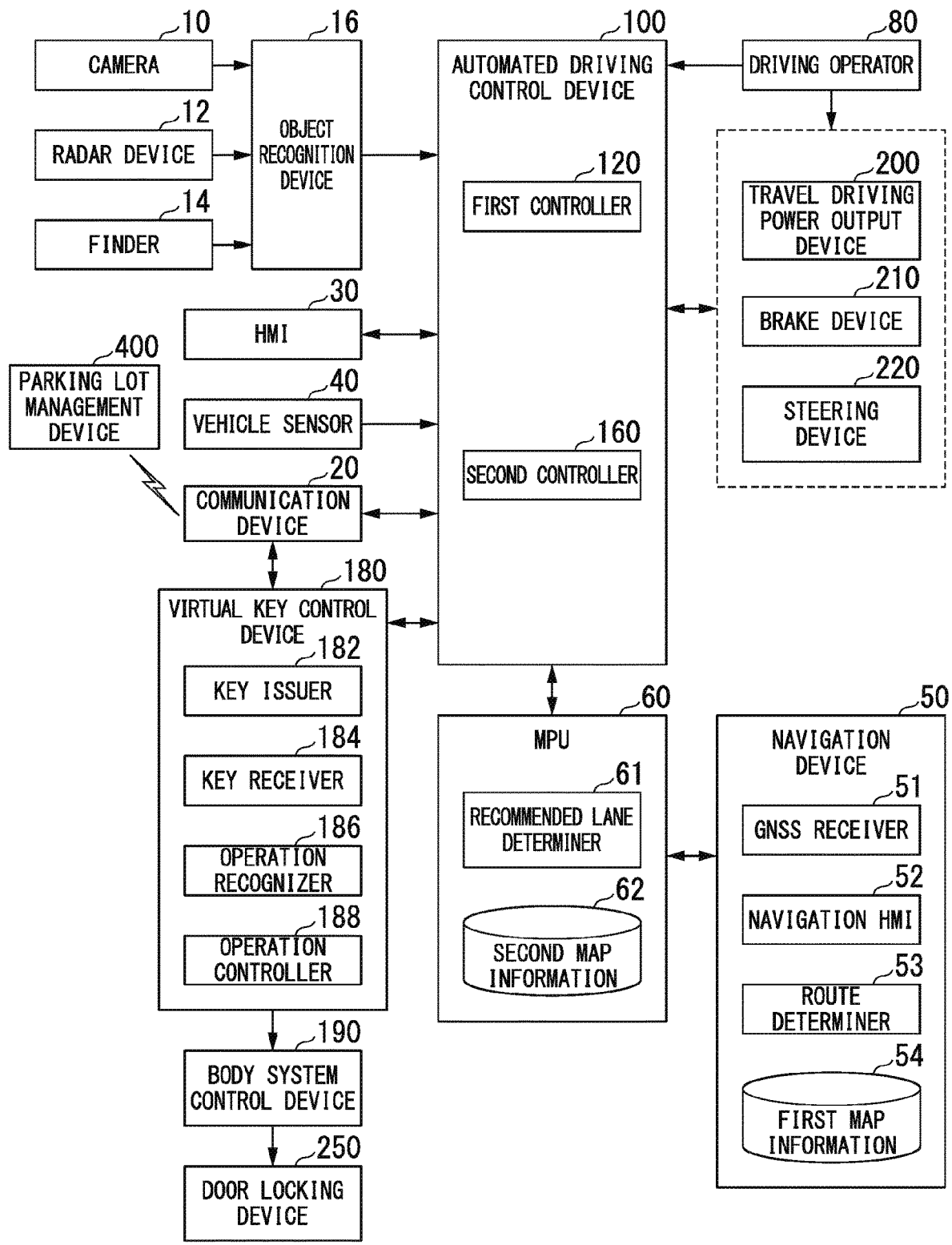
FIG. 1 is a diagram showing a configuration of a vehicle system in which a vehicle control device according to an embodiment is used.

FIG. 1 is a diagram showing a configuration of a vehicle system 1 in which a vehicle control device according to an embodiment is used. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, or a combination thereof. The electric motor operates using power generated by a power generator connected to the internal combustion engine or power discharged from a secondary cell or a fuel cell. The vehicle system 1 can issue a virtual key and transmit the virtual key to another device, for example, a parking lot management device 400, through radio waves. When use information of the virtual key (hereinafter referred to as virtual key use information) transmitted by the other device receiving the virtual key is received, the vehicle system 1 sets a provisional authority of, for example, a vehicle system activation (activation of the vehicle system 1), traveling (including stopping), and unlocking of doors in the other device transmitting the virtual key use information by controlling the vehicle system 1. When the virtual key use information is received, for example, when the virtual key is a personal identification number (PIN), the PIN transmitted as the virtual key use information matches a PIN stored in the parking lot management device 400 in some cases.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a virtual key control device 180, and a body system control device 190, a travel driving power output device 200, a brake device 210, a steering device 220, and a door locking device 250. The devices and units are connected to one another via a multiplex communication line such as a controller area network (CAN) communication line, a serial communication line, or a wireless communication network. The configuration shown in FIG. 1 is merely exemplary, a part of the configuration may be omitted, and another configuration may be further added.

The camera 10 is, for example, a digital camera that uses a solid-state image sensor such as a charged coupled device (CCD) or a complementary metal oxide semiconductor (CMOS). The camera 10 is mounted on any portion of a vehicle in which the vehicle system 1 is mounted (hereinafter referred to as an own vehicle M). When the camera 10 images a front side, the camera 10 is mounted on an upper portion of a front windshield, a rear surface of a rearview mirror, or the like. For example, the camera 10 repeatedly images the surroundings of the own vehicle M periodically. The camera 10 may be a stereo camera.

The radar device 12 radiates radio waves such as millimeter waves to the surroundings of the own vehicle M and detects radio waves (reflected waves) reflected from an object to detect at least a position (a distance from and an azimuth of) of the object. The radar device 12 is mounted on any portion of the own vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. The finder 14 is mounted on any portions of the own vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving control device 100. The object recognition device 16 may output detection results of the camera 10, the radar device 12, and the finder 14 to the automated driving control device 100 without any change. The object recognition device 16 may be excluded from the vehicle system 1.

The communication device 20 communicates with another vehicle around the own vehicle M, another device such as the parking lot management device 400, or various server devices by using, for example, a cellular network, a Wi-Fi network, Bluetooth (registered trademark), dedicated short range communication (DSRC) or the like. The communication device 20 transmits a virtual key to another device, for example, the parking lot management device 400, in response to an operation of the virtual key control device 180. The communication device 20 receives information transmitted by the other device, for example, virtual key use information transmitted through radio waves by the parking lot management device 400, and outputs the virtual key use information to the virtual key control device 180 in response to an operation of the virtual key control device 180.

The HMI 30 presents various types of information to occupants of the own vehicle M and receives input operations by the occupants. The HMI 30 includes various display devices, speakers, buzzers, touch panels, switches, and keys. The switches of the HMI 30 includes an unlocking permission switch. When the unlocking permission switch is turned on, the HMI 30 outputs permission information indicating permission to unlock doors to the virtual key control device 180 via the automated driving control device 100. The HMI 30 may directly output the permission information to the virtual key control device 180.

The vehicle sensor 40 includes a vehicle speed sensor that detects a speed of the own vehicle M, an acceleration sensor that detects acceleration, a yaw rate sensor that detects angular velocity around a vertical axis, and an azimuth sensor that detects a direction of the own vehicle M. Further, the vehicle sensor 40 includes a radio wave strength sensor that detects a radio wave strength (communication strength) of radio waves transmitted by the parking lot management device 400. The vehicle sensor 40 outputs detection results of various sensors to the automated driving control device 100. The automated driving control device 100 outputs a radio wave strength detected by the radio wave strength sensor among the detection results of the various sensors to the virtual key control device 180.

The navigation device 50 includes, for example, a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 specifies a position of the own vehicle M based on signals received from GNSS satellites. The position of the own vehicle M may be specified or complemented for by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include a curvature of a road and point of interest (POI) information. The route on the map is output to the MPU 60. The navigation device 50 may perform route guidance using the navigation HMI 52 based on the route on the map. The navigation device 50 may be realized by, for example, a function of a terminal device such as a smartphone or a tablet terminal possessed by an occupant. The navigation device 50 may transmit a present position and a destination to a navigation server via the communication device 20 to acquire the same route as the route on the map from the navigation server.

The MPU 60 includes, for example, a recommended lane determiner 61 and retains second map information 62 in a storage device such as an HDD or a flash memory. The recommended lane determiner 61 divides the route on the map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location in the route on the map, the recommended lane determiner 61 determines a recommended lane so that the own vehicle M can travel in a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently by communicating with another device using the communication device 20.

The driving operator 80 includes, for example, an accelerator pedal, a brake pedal, a shift lever, a steering wheel, a heteromorphic steering wheel, a joystick, and other operators. A sensor that detects whether there is an operation or an operation amount is mounted in the driving operator 80 and a detection result is output to the automated driving control device 100 or some or all of the travel driving power output device 200, the brake device 210, and the steering device 220.

The automated driving control device 100 includes, for example, a first controller 120 and a second controller 160. Each of the first controller 120 and the second controller 160 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device (a storage device including a non-transitory storage medium) such as an HDD or a flash memory of the automated driving control device 100 or may be stored in a detachably mounted storage medium such as a DVD, a CD-ROM, or the like so that the storage medium (a non-transitory storage medium) is mounted on a drive device to be installed on the HDD or the flash memory of the automated driving control device 100.

Figure 2:
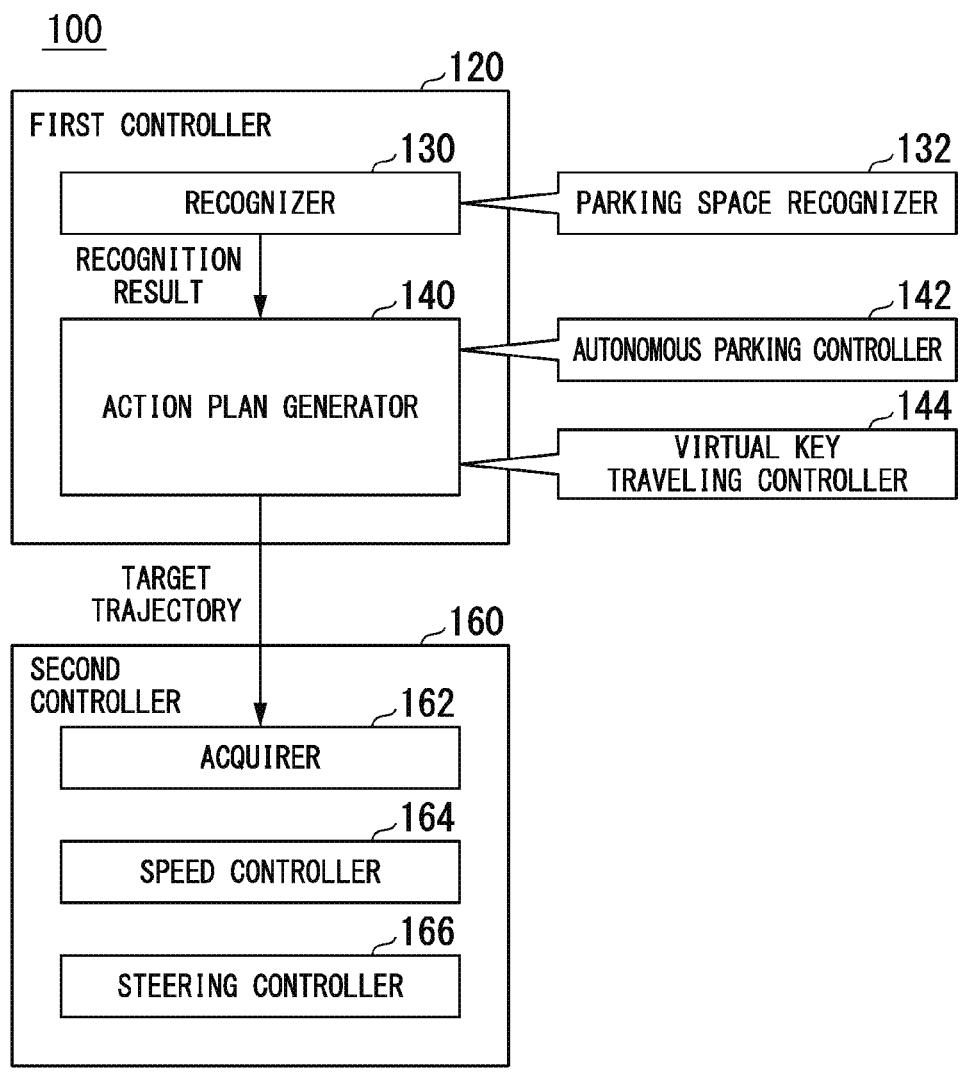
FIG. 2 is a diagram showing a functional configuration of a first controller and a second controller.

FIG. 2 is a diagram showing a functional configuration of the first controller 120 and the second controller 160. The first controller 120 includes, for example, a recognizer 130 and an action plan generator 140. The first controller 120 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 130 recognizes states such as a position, a speed, acceleration, or the like of an object near the own vehicle M based on information input from the camera 10, the radar device 12, and the finder 14 via the object recognition device 16. For example, the position of the object is recognized as a position on the absolute coordinates in which a representative point (a center of gravity, a center of a driving shaft, or the like) of the own vehicle M is the origin and is used for control. The position of the object may be represented as a representative point such as a center of gravity, a corner, or the like of the object or may be represented as expressed regions. A "state" of an object may include acceleration or jerk of the object or an "action state" (for example, whether a vehicle is changing a lane or is attempting to change the lane).

The recognizer 130 recognizes, for example, a lane in which the vehicle M is traveling (a travel lane). For example, the recognizer 130 recognizes the travel lane by comparing patterns of road mark lines (for example, arrangement of continuous lines and broken lines) obtained from the second map information 62 with patterns of road mark lines around the vehicle M recognized from images captured by the camera 10. The recognizer 130 may recognize a travel lane by recognizing runway boundaries (road boundaries) including road mark lines or shoulders, curbstones, median strips, and guardrails without being limited to road mark lines. In this recognition, the position of the vehicle M acquired from the navigation device 50 or a process result by INS may be added. The recognizer 130 recognizes temporary stop lines, obstacles, red signals, toll gates, and other road events.

The recognizer 130 recognizes a position or a posture of the own vehicle M in the travel lane when the recognizer 130 recognizes the travel lane. For example, the recognizer 130 may recognize a separation from the middle of a lane of a standard point of the own vehicle M and an angle formed with a line extending along the middle of a lane in the movement direction of the own vehicle M as a relative position and posture of the own vehicle M to the travel lane. Instead of this, the recognizer 130 may recognize a position or the like of the standard point of the own vehicle M with respect to any side end portion (a road mark line or a road boundary) of a travel lane as the relative position of the own vehicle M to the travel lane.

The recognizer 130 includes a parking space recognizer 132 activated in an autonomous parking event to be described below. The details of a function of the parking space recognizer 132 will be described later.

The action plan generator 140 generates a target trajectory along which the own vehicle M travels in future automatedly (irrespective of an operation or the like by a driver) so that the own vehicle M is traveling along a recommended lane determined by the recommended lane determiner 61 and can handle a surrounding situation of the own vehicle M in principle. The target trajectory includes, for example, a speed component. For example, the target trajectory is expressed by arranging spots (trajectory points) at which the own vehicle M will arrive in sequence. The trajectory point is a spot at which the own vehicle M will arrive for each predetermined travel distance (for example, about several [m]) in a distance along a road. Apart from the trajectory points, target acceleration and a target speed are generated as parts of the target trajectory for each of predetermined sampling times (for example, about a decimal point of a second). The trajectory point may be a position at which the own vehicle M will arrive at the sampling time for each predetermined sampling time. In this case, information regarding the target acceleration or the target speed is expressed according to an interval between the trajectory points.

The action plan generator 140 may set an automated driving event when the target trajectory is generated. As the automated driving event, there are an autonomous parking event in which parking is performed through unmanned traveling, a virtual key traveling event in which a virtual key is used, and the like in a constant speed traveling event, a low-speed following traveling event, a lane changing event, a branching event, a joining event, a takeover event, valet parking, and the like. The action plan generator 140 generates the target trajectory in accordance with an activated event. The action plan generator 140 includes an autonomous parking controller 142 activated when an autonomous parking event is performed. The action plan generator 140 includes a virtual key traveling controller 144 activated when a virtual key traveling event is performed. The details of functions of the autonomous parking controller 142 and the virtual key traveling controller 144 will be described later.

The second controller 160 controls the travel driving power output device 200, the brake device 210, and the steering device 220 so that the own vehicle M passes along the target trajectory generated by the action plan generator 140 at a scheduled time.

Referring back to FIG. 2, the second controller 160 includes, for example, an acquirer 162, a speed controller 164, and a steering controller 166. The acquirer 162 acquires information regarding a target trajectory (trajectory points) generated by the action plan generator 140 and stores the information in a memory (not shown). The speed controller 164 controls the travel driving power output device 200 or the brake device 210 based on a speed element incidental to the target trajectory stored in the memory. The steering controller 166 controls the steering device 220 in accordance with a curve state of the target trajectory stored in the memory. Processes of the speed controller 164 and the steering controller 166 are realized, for example, by combining feed-forward control and feedback control. For example, the steering controller 166 performs the feed-forward control in accordance with a curvature of a road in front of the own vehicle M and the feedback control based on separation from the target trajectory in combination.

The virtual key control device 180 includes a key issuer 182, a key receiver 184, an operation recognizer 186, and an operation controller 188. The virtual key control device 180 is an example of a "vehicle control device."

The key issuer 182 issues a virtual key for controlling the own vehicle M. The virtual key is configured by, for example, electronic data such as a PIN or passcode and can be transmitted to the other device using the communication device 20. The key issuer 182 issues the virtual key only to, for example, the other device to be used. The virtual key is validated at the time point of issuing and is validated only when the other device limited as a use destination is used. The virtual key enables the other device to perform an operation of the own vehicle M through automated valet parking control on the own vehicle M, for example, within the range of the parking facility P (see FIG. 4). The automated valet parking control includes not only an entrance request or a return request but also a movement request to the own vehicle M which is being stopped. In the automated valet parking control, determination based on an element such as a zone (for example, whether to be in a parking facility), a mode (whether to be in a mode of automated valet parking), or a time (whether a parking lot is booked) is performed.

For example, the key issuer 182 may issue the virtual key whenever a parking facility P is used or may prepare a plurality of virtual keys, select a virtual key to be transmitted among the plurality of virtual keys, and issue the selected virtual key. The key issuer 182 transmits the issued virtual key to another device, for example, the parking lot management device 400, using the communication device 20. The key issuer 182 adds information permitted to be output to the virtual key when permission information is output by the HMI 30.

At the time of validation of the virtual key, the key issuer 182 invalidates the validated virtual key when a condition for invalidating the virtual key is established. As the condition for invalidating the virtual key, the own vehicle M leaves the parking facility P or deviates from a communication range with another device, and the own vehicle M exits from a parking space PS (see FIG. 4) based on an instruction from the user. The key issuer 182 invalidates the validated virtual key when the own vehicle M leaves the parking facility P, deviates from a communicable range with the parking lot management device 400, or exits from the parking space PS based on an instruction from the user.

The case in which the virtual key is invalidated includes a case in which the control of the own vehicle M performed in the parking lot management device 400 is stopped and a case in which the own vehicle M cannot be controlled in the parking lot management device 400 even when the same virtual key is transmitted to another device in future other than the parking lot management device 400. Specifically, the virtual key control device 180 transmitting the virtual key may temporarily store a key list of validated virtual keys in a storage (not shown) and delete the invalidated virtual key from the key list. Alternatively, for the virtual keys included in the key list, an invalid flag may be added to an invalidated virtual key.

The key receiver 184 receives the virtual key use information transmitted by another device and received and output by the communication device 20. When the virtual key use information is received, the key receiver 184 treats the virtual key in the other device transmitting the virtual key use information as being valid and causes the other device to control the own vehicle M. For example, when the parking lot management device 400 transmits the virtual key use information, the key receiver 184 causes the parking lot management device 400 to control the own vehicle M.

An operation on the own vehicle M by the other device includes an operation of giving an instruction to activate a system of the vehicle for traveling. When the permission information is added to the virtual key received by the other device transmitting the virtual key use information, the operation on the own vehicle M by the other device includes an operation of giving an instruction to unlock the own vehicle M. When the permission information is not added to the virtual key received by the other device transmitting the virtual key use information, the operation on the own vehicle M by the other device does not include the operation of giving an instruction to unlock the own vehicle M.

The operation recognizer 186 receives an instruction to operate the own vehicle M transmitted by the other device and recognizes content of an operation of the own vehicle M requested by the other device. For example, when the parking lot management device 400 transmits an operation instruction including an unlocking instruction, the operation recognizer 186 recognizes a request for an operation of unlocking a door of the own vehicle M. Alternatively, when the parking lot management device 400 transmits an operation instruction including an activation instruction and a traveling instruction, the operation recognizer 186 causes the own vehicle M to activate and recognizes an operation request for movement from the parking space PS to a predetermined movement position. The operation recognizer 186 outputs information to the operation controller 188 in response to the recognized operation requested by the other device.

The operation controller 188 controls an operation in response to an operation of the own vehicle M requested by the other device. For example, when the operation recognizer 186 receives the operation instruction including the instruction to unlock the door, the operation controller 188 outputs information regarding the operation of unlocking the door to the body system control device 190 to unlock the door. When the operation recognizer 186 receives the operation instruction including the activation instruction and the traveling instruction, the operation controller 188 outputs information for moving the own vehicle M along a movement route included in the operation instruction to the automated driving control device 100 to cause the own vehicle M to be activated and move.

The body system control device 190 operates the door locking device 250 to lock or unlock the door of the own vehicle M. The body system control device 190 causes the door locking device 250 to unlock the door when the door of the own vehicle M is locked and the operation controller 188 outputs information regarding an operation of unlocking the door. The body system control device 190 may perform the control together on some or all of a wiper, a power window, an auto-door, and the like in addition to a device related to the body of the own vehicle M, for example, the foregoing door locking device 250.

The travel driving power output device 200 outputs a travel driving power (torque) for traveling the vehicle to a driving wheel. The travel driving power output device 200 includes, for example, a combination of an internal combustion engine, an electric motor, and a transmission and an electronic control unit (ECU) controlling them. The ECU controls the foregoing configuration in accordance with information input from the second controller 160 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second controller 160 or information input from the driving operator 80.

Figure 3:
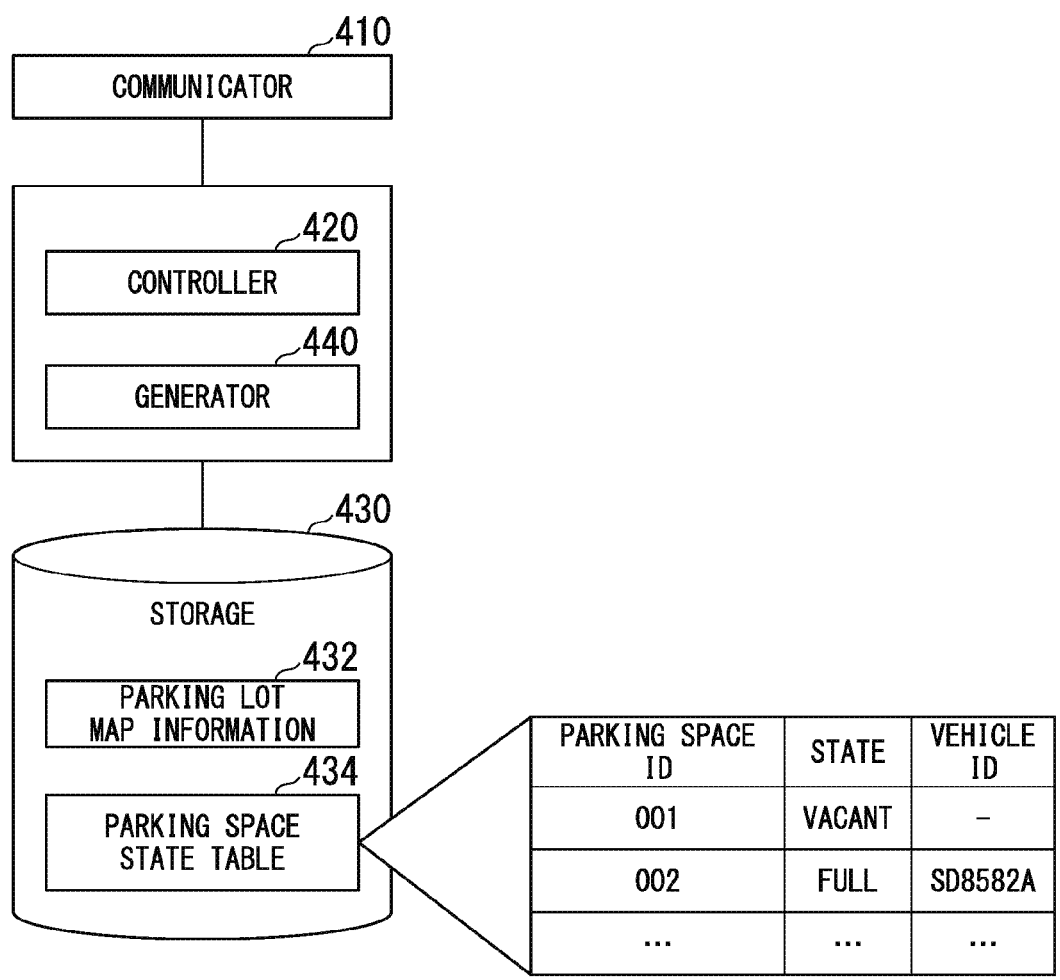
FIG. 3 is a diagram showing an example of a configuration of a parking lot management device.

FIG. 3 is a diagram showing an example of a configuration of the parking lot management device 400. The parking lot management device 400 includes, for example, a communicator 410, a controller 420, a storage 430, and a generator 440. Information such as parking lot map information 432 or a parking space state table 434 is stored in the storage 430.

The door locking device 250 is, for example, a device that can lock each door so that each door of the own vehicle M is not opened. The door locking device 250 includes, for example, an engagement member provided in each door, an engagement receiver provided on the vehicle body, and an electric actuator detachably mounted to engage the engagement member with the engagement receiver. The door locking device 250 locks each door so that each door is not opened by engaging the engagement member with the engagement receiver. On the other hand, the door locking device 250 releases (unlocks) the locking of each door by separating the engagement member from the engagement receiver. The body system control device 190 controls the electric actuator in the door locking device 250 such that the door locking device 250 locks or unlocks each door. The door locking device 250 is not limited to this example and the configuration of the door locking device 250 is not limited as long as each door can be locked under the control of the body system control device 190.

The communicator 410 wirelessly communicates with a vehicle near the parking lot management device 400, another device such as another terminal device, or various server devices by using a cellular network, a Wi-Fi network, Bluetooth (registered trademark), DSRC, or the like. The communicator 410 is considered to be able to communicate with vehicles within the parking facility P and has a communicable range within the parking facility P. The controller 420 guides a vehicle to the parking space PS based on information acquired by the communicator 410 and information stored in the storage 430. The parking lot map information 432 is information geometrically expressing the structure of the parking lot PA shown in FIG. 4.

Figure 4:
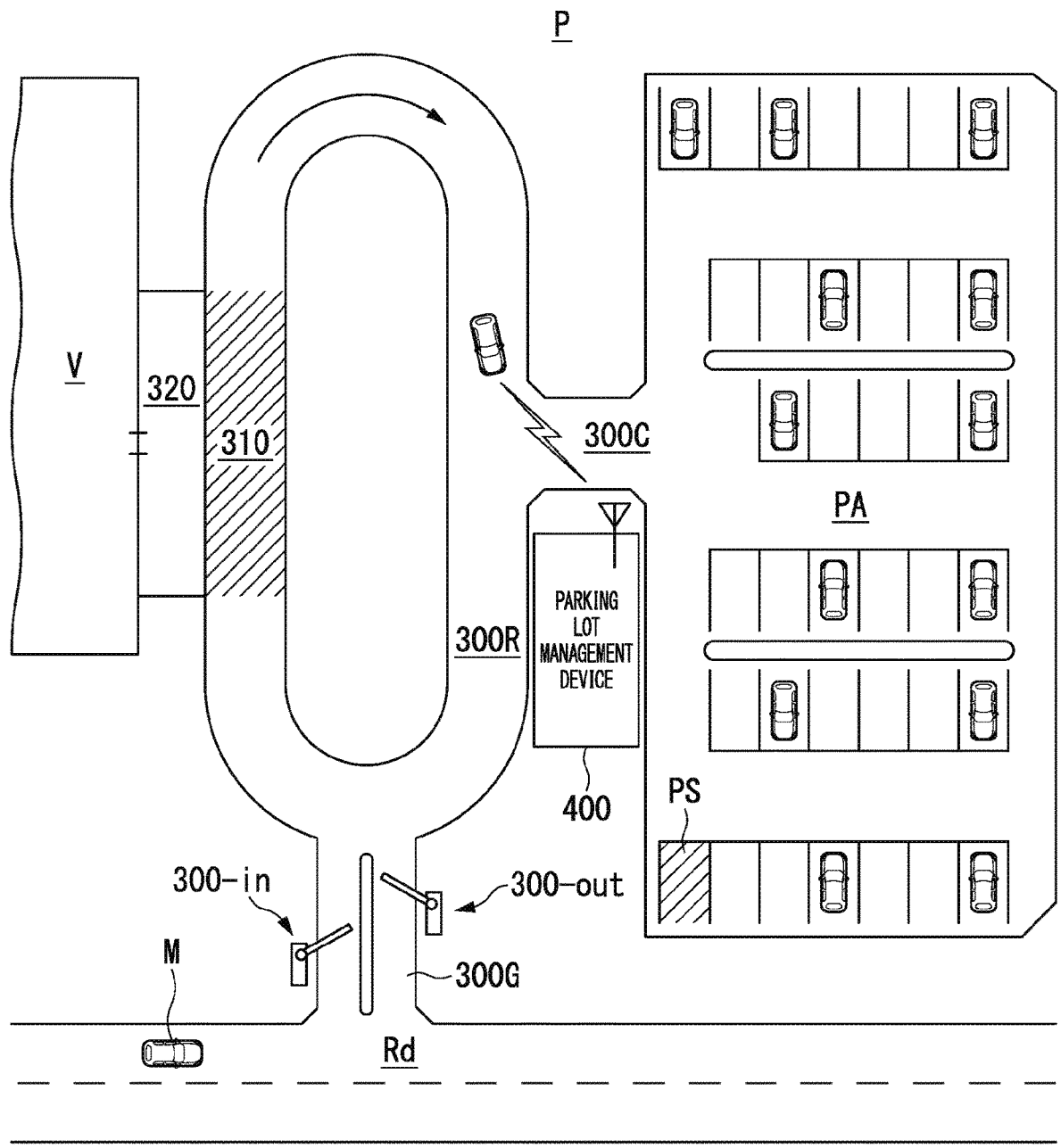
FIG. 4 is a diagram schematically showing a region including a parking facility.

FIG. 4 is a diagram schematically showing a region including a parking facility P. As shown in FIG. 4, a visit facility V and the parking facility P are arranged side by side on a lateral side of a road Rd. The parking facility P includes a gate passage 300G, a circulating passage 300R, and a communication passage 300C. The gate passage 300G is formed from the road Rd to the visit facility, and gates 300-in and 300-out are formed in the gate passage 300G. The circulating passage 300R is formed to be circular (elliptical) in front of the gate passage 300G. A stopping area 310 is set in an adjoining portion of the visit facility V in the circulating passage 300R and a boarding area 320 between the stopping area 310 and the visit facility V is formed. The stopping area 310 faces a boarding area 320 connected to the visit facility. In the boarding area 320, an eave is provided to block rain and snow.

The stopping area 310 is formed on one long side of the circulating passage 300R and the communication passage 300C communicating with a space between the circulating passage 300R and the parking lot PA is connected on the other long side. The parking lot PA is formed to be substantially rectangular and the parking lot PA is formed along the long side of the circulating passage 300R. The parking lot management device 400 is provided at a position surrounded on three sides by the circulating passage 300R, the communication passage 300C, and the parking lot PA.

Referring back to FIG. 3, the parking lot map information 432 includes coordinates of each parking space PS. In the parking space state table 434, for example, a state which indicates a vacant state or a full (parking) state and a vehicle ID which is identification information of a vehicle parked in the case of the full state are associated with a parking space ID which is identification information of the parking space PS.

When the communicator 410 receives a parking request from a vehicle, the controller 420 extracts the parking space PS of which a state is a vacant state with reference to the parking space state table 434, acquires a position of the extracted parking space PS from the parking lot map information 432, and transmits a suitable route to the acquired position of the parking space PS to the vehicle through the communicator 410. The controller 420 instructs a specific vehicle to stop or move slowly, as necessary, based on a positional relation between a plurality of vehicles so that the vehicles do not simultaneously advance to the same position.

In a vehicle receiving the route (hereinafter, assumed to be the own vehicle M), the autonomous parking controller 142 generates a target trajectory based on the route. When the own vehicle M approaches the parking space PS which is a target, the parking space recognizer 132 recognizes parking frame lines or the like marking the parking space PS, recognizes a detailed position of the parking space PS, and supplies the detailed position of the parking space PS to the autonomous parking controller 142. The autonomous parking controller 142 receives the detailed position of the parking space PS, corrects the target trajectory, and parks the own vehicle M in the parking space PS.

The generator 440 receives a virtual key transmitted by the own vehicle M by using the communicator 410. When the generator 440 receives the virtual key, the generator 440 generates the virtual key use information to be transmitted to the own vehicle M which has transmitted the virtual key. The generator 440 transmits the generated virtual key use information to the own vehicle M by using the communicator 410.

When an inconvenience in which it is necessary for a vehicle to move when a vehicle stays in the parking facility P occurs, the generator 440 controls the vehicle transmitting the virtual key by using the virtual key. For example, when it is necessary to unlock the own vehicle M and an unlocking request is acquired, for example, when a moving object remains in the own vehicle M, the generator 440 generates an operation instruction including an unlocking instruction used to give an instruction to unlock a door. For example, when a vehicle movement request is acquired because of a necessity to provide an emergency vehicle such as an ambulance with the parking space PS in which the own vehicle M is parked, the generator 440 generates an operation instruction including an activation instruction and a traveling instruction for the own vehicle M. At this time, the operation instruction includes a movement route of the own vehicle M. Subsequently, the generator 440 transmits the virtual key use information to the own vehicle M and subsequently transmits the generated operation instruction. For the own vehicle M, the own vehicle M is controlled based on the operation instruction transmitted by the generator 440 and, for example, control is performed such that each door is unlocked or control is performed such that the own vehicle M is moved based on the movement route included in the operation instruction.

Figure 5:
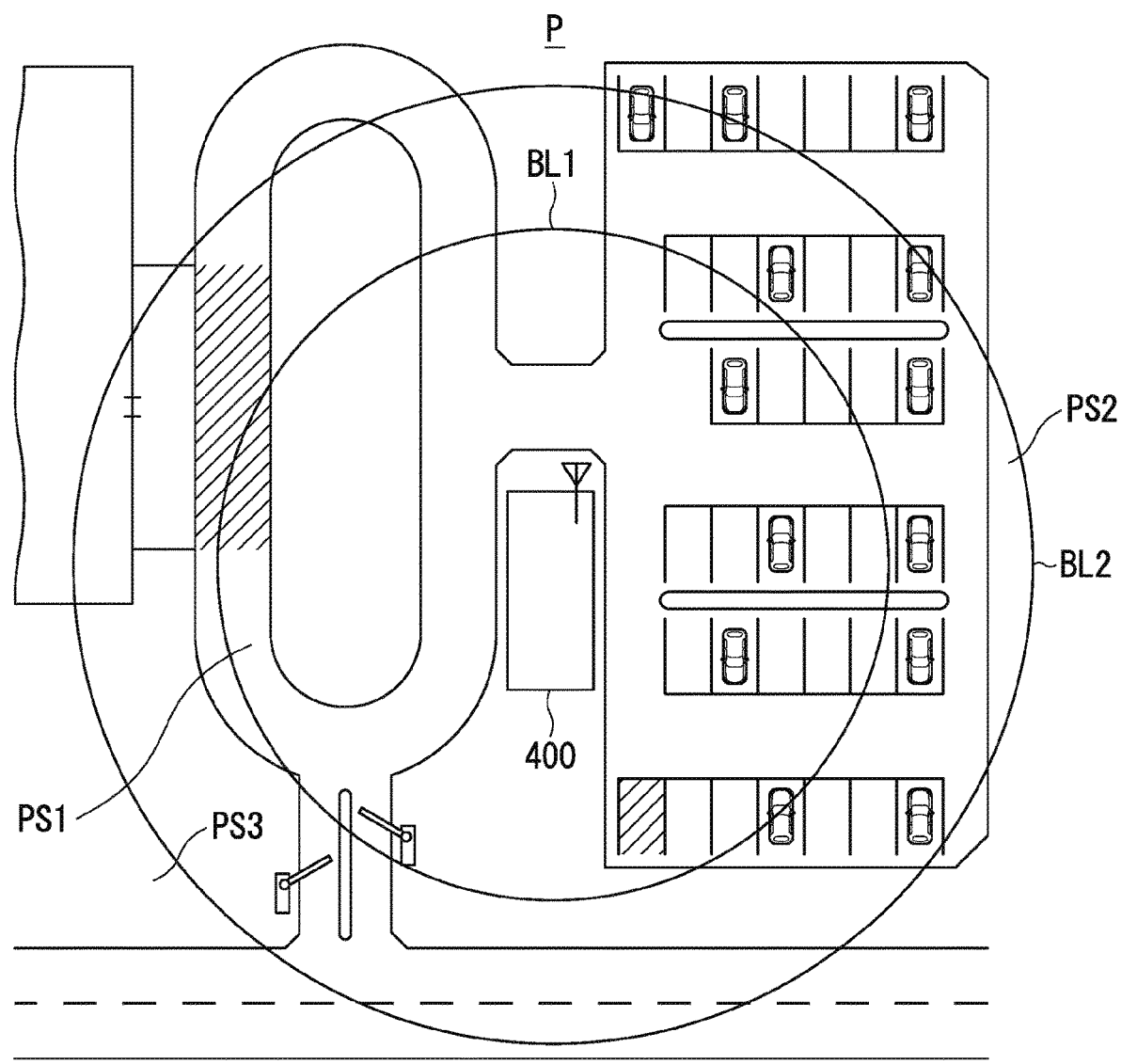
FIG. 5 is a diagram showing an example of a distribution of a radio wave strength of the parking facility.

The operation controller 188 adjusts a control amount of the own vehicle M controlled by the second controller 160 based on a radio wave strength output by the radio wave strength sensor included in the vehicle sensor 40. For example, as shown in FIG. 5, a region which is a region inside an inner virtual boundary line BL1 and is a region where the radio wave strength of radio waves transmitted by the parking lot management device 400 is equal to or greater than a first strength is referred to as a first strength region PS1. A region which is a region between the inner virtual boundary line BL1 and an outer virtual boundary line BL2 and is a region where the radio wave strength of radio waves transmitted by the parking lot management device 400 is less than the first strength and equal to or greater than a second strength is referred to as a second strength region PS2. The radio wave strength of the second strength is a radio wave strength weaker than the radio wave strength of the first strength. A region which is a region outside of the outer virtual boundary line BL2 and is a region where the strength of radio waves transmitted by the parking lot management device 400 is less than the second strength is referred to as a third strength region PS3. Instead of or in addition to the detection by the radio wave strength sensor, the radio wave strength inside the parking facility P may be obtained by generating a radio wave strength map in the parking facility P and obtaining a current position of the own vehicle M with reference to the radio wave strength map.

The operation controller 188 causes the second controller 160 to control the own vehicle M with a first control amount which is a normal control amount when the own vehicle M stays in the first strength region PS1. The operation controller 188 causes the own vehicle M to operate with a second control amount of which a control degree is lower than the first control amount when the own vehicle M stays in the second strength region PS2. Here, when the own vehicle M is caused to operate with the second control amount of which the control degree is lower than the first control amount, a change in a behavior of the own vehicle M, for example, a change in a speed, acceleration, a rudder angle, or the like, decreases. For example, a trajectory due to the change in the behavior is identical and a movement time is lengthened.

The operation controller 188 causes the second controller 160 to stop the own vehicle M when the own vehicle M stays in the third strength region PS3. The operation controller 188 invalidates the validated virtual key at the time of leaving from the parking facility P even when the own vehicle M is in any of the first strength region PS1 to the third strength region PS3.

[Autonomous Parking Event: At Time of Entrance]

For example, the autonomous parking controller 142 parks the own vehicle M in a parking space based on information acquired from a parking lot management device 400 through the communication device 20. FIG. 4 schematically shows a scenario in which an autonomous parking event is performed. As shown in FIG. 4, the own vehicle M passes through the gate 300-in and moves up to the stopping area 310 through manual driving or automated driving. After an occupant gets out of a vehicle in the stopping area 310, the own vehicle M performs unmanned automated driving and starts an autonomous parking event for moving to the parking space PS in the parking lot PA. A trigger to start the autonomous parking event may be, for example, any operation by the occupant or may be wireless reception of a predetermined signal from the parking lot management device 400. When the autonomous parking event starts, the autonomous parking controller 142 controls the communication device 20 such that a parking request is transmitted to the parking lot management device 400. Then, the own vehicle M moves in accordance with guidance of the parking lot management device 400 or moves by performing sensing by itself from the stopping area 310 to the parking lot PA.

[Autonomous Parking Event: At Time of Return]

The autonomous parking controller 142 and the communication device 20 maintain an operation state even while the own vehicle M is parked. For example, when the communication device 20 receives a pickup request from a terminal device of an occupant, the autonomous parking controller 142 activates a system of the own vehicle M and causes the own vehicle M to move to the stopping area 310. At this time, the autonomous parking controller 142 controls the communication device 20 such that a launch request is transmitted to the parking lot management device 400. The controller 420 of the parking lot management device 400 instructs a specific vehicle to stop or move slowly, as necessary, based on a positional relation between a plurality of vehicles so that the vehicles do not simultaneously advance to the same position, as in the time of entrance. When the own vehicle M is caused to move to the stopping area 310 and picks up the occupant, the autonomous parking controller 142 stops the operation. Thereafter, manual driving or automated driving by another functional unit starts.

The present invention is not limited to the above description. The autonomous parking controller 142 may find a vacant parking space by itself based on a detection result by the camera 10, the radar device 12, the finder 14, or the object recognition device 16 irrespective of communication and may cause the own vehicle M to park in the found parking space.

[Virtual Key Traveling Event]

The virtual key control device 180, the virtual key traveling controller 144, and the communication device 20 maintain an operation state even during traveling or parking of the own vehicle M from entrance of the own vehicle M to the range of the parking facility P to leaving of the own vehicle M from the parking facility P. The virtual key control device 180 activates a system of the own vehicle M during stopping of the own vehicle M, for example, when the communication device 20 receives the virtual key use information transmitted by the parking lot management device 400. Subsequently, the virtual key control device 180 controls the own vehicle M based on an operation instruction transmitted by the parking lot management device 400 when the virtual key use information transmitted by the parking lot management device 400 is received. For example, the virtual key control device 180 causes the virtual key traveling controller 144 to generate a target trajectory based on a movement path based on the movement route included in the operation instruction. The second controller 160 outputs operation information used to operate the travel driving power output device 200, the brake device 210, and the steering device 220 to the travel driving power output device 200, the brake device 210, and the steering device 220 so that the own vehicle M passes along the target trajectory generated by the virtual key traveling controller 144 at a scheduled time. At this time, the own vehicle M moves in accordance with guidance of the parking lot management device 400 or moves by performing sensing by itself.

[Control on Door Locking Device 250 by Virtual Key Control Device 180]

The virtual key control device 180, the body system control device 190, and the communication device 20 maintain an operation state even during traveling or parking of the own vehicle M from entrance of the own vehicle M to the parking facility P to leaving of the own vehicle M from the parking facility P. The virtual key control device 180 causes the body system control device 190 to operate the door locking device 250 and unlocks the doors of the own vehicle M, for example, when the communication device 20 receives an operation instruction including an unlocking instruction transmitted by the parking lot management device 400.

Next, as an example of a case in which another device is the parking lot management device 400, a process performed by the virtual key control device 180 and the parking lot management device 400 will be described. The vehicle system 1 in which the own vehicle M is mounted issues the virtual key and transmits the virtual key to the parking lot management device 400 when the own vehicle M enters the parking facility P. A provisional authority to control the own vehicle M is set in the parking lot management device 400 to which the virtual key has been transmitted from the entrance of the own vehicle M to the parking facility P to the leaving of the own vehicle M from the parking facility P. Therefore, the parking lot management device 400 enters a state in which the own vehicle M can be controlled. The parking lot management device 400 transmits the virtual key use information to the own vehicle M when the own vehicle M is controlled.

Figure 6:
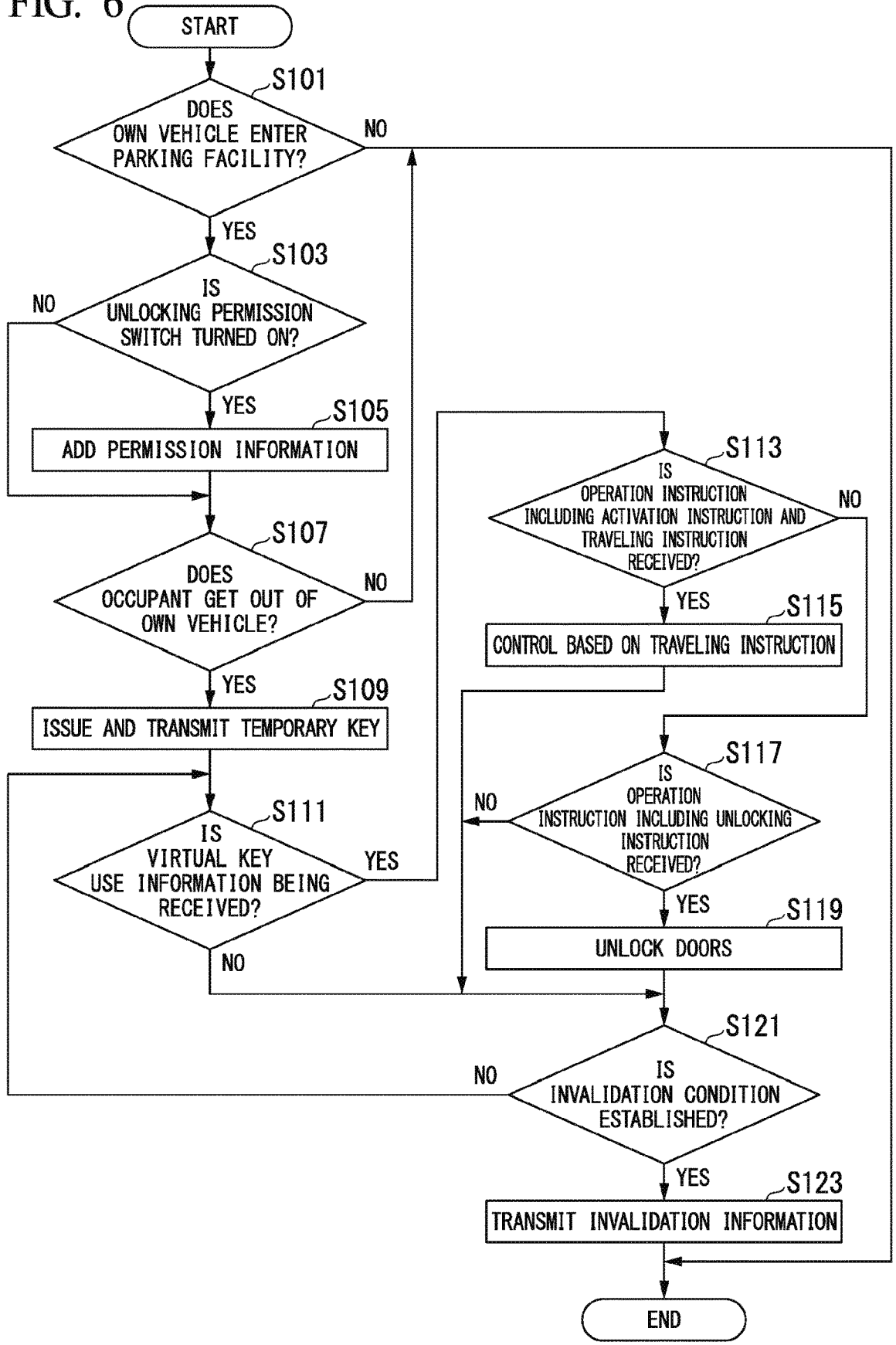
FIG. 6 is a flowchart showing an example of a process performed by a virtual key control device.

First, a process in the virtual key control device 180 will be described. FIG. 6 is a flowchart showing an example of a process performed by a virtual key control device 180. The virtual key control device 180 determines whether the own vehicle M enters the parking facility P (step S101). When the virtual key control device 180 determines that the own vehicle M does not enter the parking facility P, the virtual key control device 180 ends the process shown in FIG. 6.

When the virtual key control device 180 determines that the own vehicle M enters the parking facility P, the key issuer 182 determines whether the HMI 30 transmits the permission information and the unlocking permission switch is turned on (step S103). When it is determined that the unlocking permission switch is turned on, the key issuer 182 adds the permission information to the virtual key (step S105). When it is determined that the unlocking permission switch is not turned on, the key issuer 182 causes the process to proceed to step S107 as it is.

Subsequently, the key issuer 182 determines whether an occupant gets out of the own vehicle M (step S107). When the key issuer 182 determines that the occupant does not get out of the own vehicle M, the key issuer 182 ends the process shown in FIG. 6. When the key issuer 182 determines that the occupant gets out of the own vehicle M, the key issuer 182 issues the virtual key and transmits the virtual key to the parking lot management device 400 (step S109). The parking lot management device 400 acquires the provisional authority to control the own vehicle M by receiving the virtual key. The parking lot management device 400 acquiring the provisional authority transmits the virtual key use information or the operation instruction to the own vehicle M to control the own vehicle M as necessary. A process in the parking lot management device 400 at the time of control on the own vehicle M will be described later.

Subsequently, the key receiver 184 determines whether the virtual key use information transmitted by the parking lot management device 400 is being received (step S111). When the key receiver 184 determines that the virtual key use information is not being received, the process proceeds to step S121. When the key receiver 184 determines that the virtual key use information is being received, the operation recognizer 186 determines whether the operation instruction including the activation instruction transmitted by the parking lot management device 400 is received (step S113).

When the operation recognizer 186 determines that the operation instruction including the activation instruction is received, the operation controller 188 causes the second controller 160 to control the own vehicle M based on the traveling instruction by transmitting information for moving the own vehicle M to the second controller 160 along the movement route included in the operation instruction (step S115). The control on the own vehicle M based on the traveling instruction will be described later. Subsequently, the operation controller 188 causes the process to proceed to step S121.

When the operation recognizer 186 determines that the operation instruction including the activation instruction is not received, the operation recognizer 186 determines whether the operation instruction including the unlocking instruction is received (step S117). When the operation recognizer 186 determines that the operation instruction including the unlocking instruction is not received, the operation recognizer 186 causes the process to proceed to step S121. When the operation recognizer 186 determines that the operation instruction including the unlocking instruction is received, the operation controller 188 causes the body system control device 190 to operate the door locking device 250 and unlock the doors (step S119).

Subsequently, the operation controller 188 determines whether an invalidation condition that the own vehicle M leaves the parking facility P or deviates from a communicable range with the parking lot management device 400, or the own vehicle M parked in the parking space PS exits from the parking space PS in response to a return instruction from a user is established (step S121). When the operation controller 188 determines that the invalidation condition that the own vehicle M leaves the parking facility P or deviates from a communicable range with the parking lot management device 400, or the own vehicle M parked in the parking space PS exits from the parking space PS in response to the return instruction from the user is not established, the operation controller 188 returns the process to step S111. When the operation controller 188 determines that the invalidation condition that the own vehicle M does not leave the parking facility P or does not deviate from a communicable range with the parking lot management device 400, or the own vehicle M parked in the parking space PS does not exit from the parking space PS in response to the return instruction from the user is established, the operation controller 188 transmits invalidation information to the parking lot management device 400 which has transmitted the virtual key use information (step S123) to invalidate the virtual key. Then, the virtual key control device 180 ends the process shown in FIG. 6.

Figure 7:
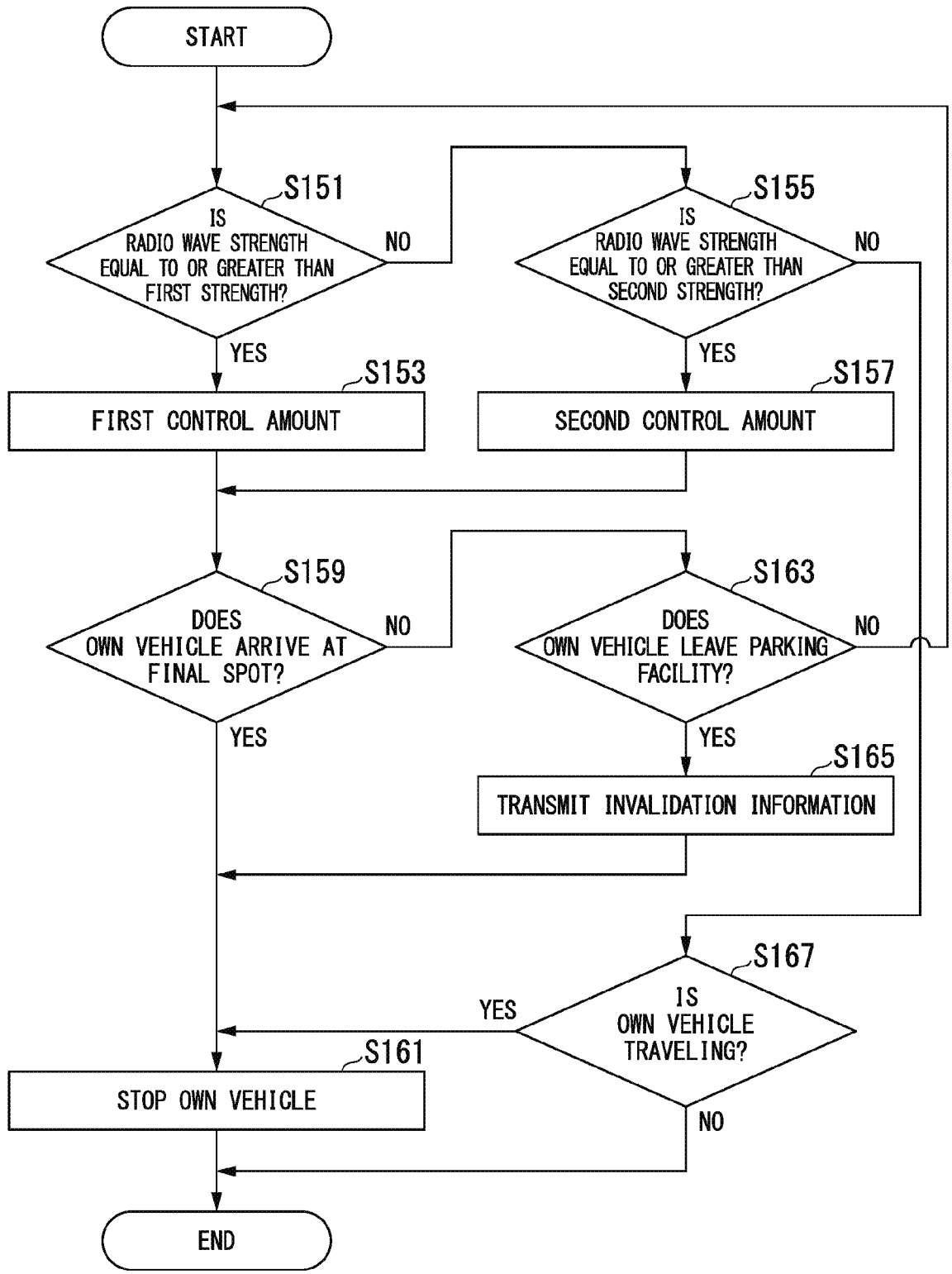
FIG. 7 is a flowchart showing an example of the process performed by the virtual key control device.

Next, control of the own vehicle M based on the traveling instruction included in the operation instruction will be described with reference to FIG. 7. The operation controller 188 receiving the operation instruction including the traveling instruction determines whether the radio wave strength output by the radio wave strength sensor included in the vehicle sensor 40 is the first strength (step S151). When the operation controller 188 determines that the radio wave strength output by the radio wave strength sensor is the first strength, the operation controller 188 causes the second controller 160 to control traveling of the own vehicle M with the first control amount (step S153).

When the operation controller 188 determines that the radio wave strength output by the radio wave strength sensor is not the first strength, the operation controller 188 determines whether the radio wave strength output by the radio wave strength sensor is the second strength (step S155). When the operation controller 188 determines that the radio wave strength output by the radio wave strength sensor is the second strength, the operation controller 188 causes the second controller 160 to control traveling of the own vehicle M with the second control amount (step S157).

Subsequently, the operation controller 188 determines whether the own vehicle M arrives at a final spot of the movement route included in the operation instruction (step S159). When the operation controller 188 determines that the own vehicle M arrives at a final spot of the movement route included in the operation instruction, the operation controller 188 causes the second controller 160 to perform the control such that the own vehicle M stops (step S161) and the process shown in FIG. 7 ends.

When the operation controller 188 determines that the own vehicle M does not arrive at the final spot of the movement route included in the operation instruction, the operation controller 188 determines whether the own vehicle M leaves the parking facility (step S163). When the operation controller 188 determines that the own vehicle M leaves the parking facility, the operation controller 188 transmits the invalidation information to the parking lot management device 400 which has transmitted the virtual key use information (step S165) to invalidate the virtual key. Thereafter, the operation controller 188 causes the second controller 160 to perform the control such that the own vehicle M stops (step S161) and the process shown in FIG. 7 ends. When the operation controller 188 determines in step S163 that the own vehicle M does not leave the parking facility, the operation controller 188 returns the process to step S151.

When the operation controller 188 determines in step S155 that the radio wave strength output by the radio wave strength sensor is not the second strength, the operation controller 188 determines whether the own vehicle M is traveling (step S167). When the operation controller 188 determines whether the own vehicle M is not traveling, the operation controller 188 ends the process shown in FIG. 7 as it is. When the operation controller 188 determines that the own vehicle M is not traveling, the virtual key traveling controller 144 causes the second controller 160 to perform the control such that the own vehicle M stops (step S161) and the process shown in FIG. 7 ends.

Figure 8:
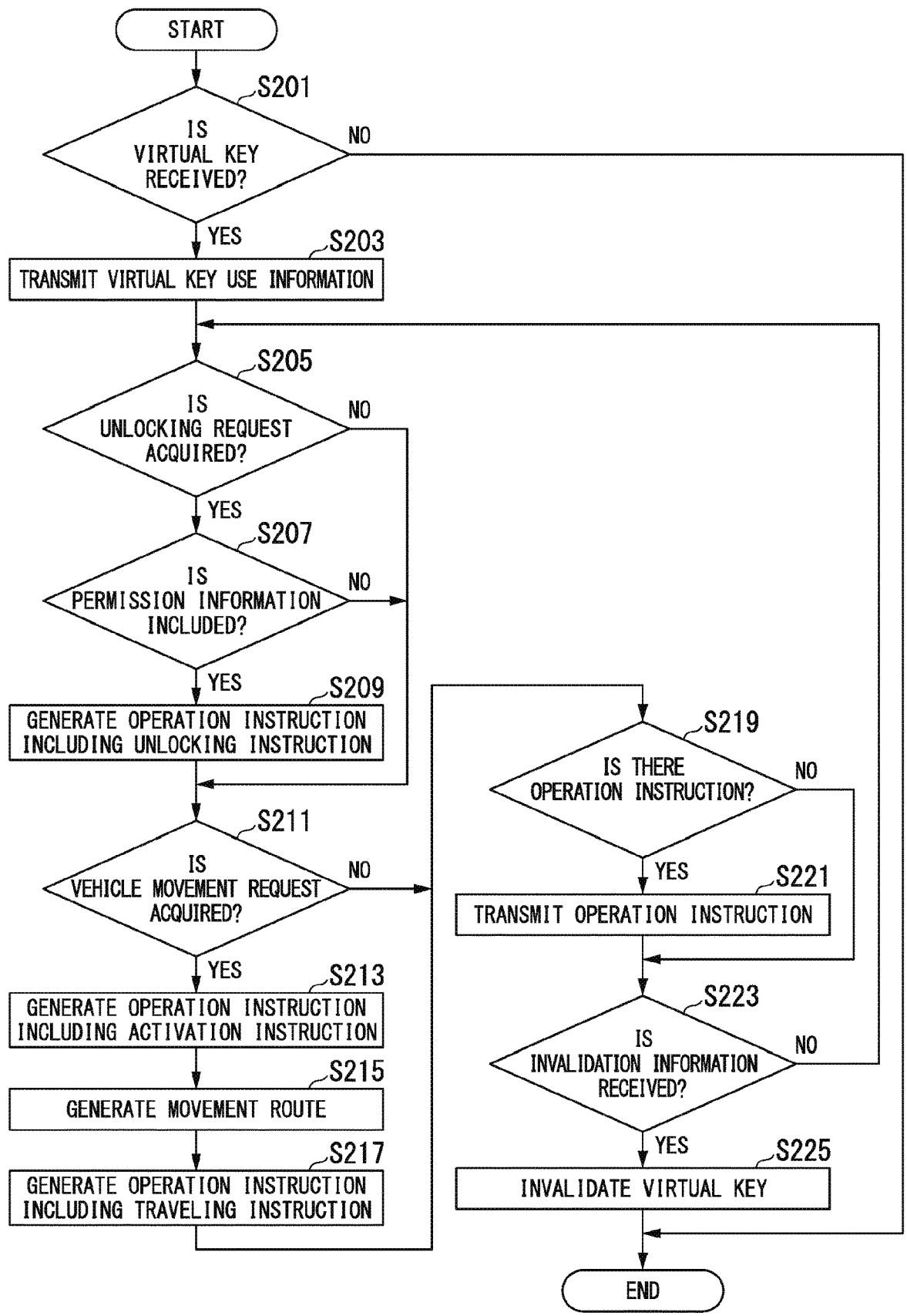
FIG. 8 is a flowchart showing an example of a process performed by a parking lot management device.

Next, a process in the parking lot management device 400 will be described. FIG. 8 is a flowchart showing an example of a process performed by the parking lot management device 400. As shown in FIG. 8, the generator 440 determines whether the virtual key transmitted by the own vehicle M is received (step S201). When the generator 440 determines that the virtual key is not received, the generator 440 ends the process shown in FIG. 8.

When the generator 440 determines that the virtual key is received, the generator 440 transmits the virtual key use information to the own vehicle M (step S203). The generator 440 determines whether it is necessary to unlock the own vehicle M and an unlocking request is acquired (step S205). When the generator 440 determines that the unlocking request is not acquired, the generator 440 causes the process to proceed to step S211 as it is.

When the generator 440 determines that the unlocking request is acquired, the generator 440 determines whether the permission information is included in the virtual key received in step S201 (step S207). When the generator 440 determines that the permission information is included, the user permits the parking lot management device 400 to unlock the own vehicle M. Since the provisional authority to unlock the doors of the own vehicle M is set in the parking lot management device 400, the generator 440 generates an operation instruction including the unlocking instruction (step S209).

When it is determined that the permission information is not included in the virtual key received in step S201, the user does not permit the parking lot management device 400 to unlock the doors and the provisional authority to unlock the doors of the own vehicle M is not set in the parking lot management device 400. Therefore, the generator 440 does not generate the operation instruction including the unlocking instruction irrespective of the unlocking request and the process proceeds to step S211. Accordingly, the parking lot management device 400 does not unlock the own vehicle M in a state in which there is no permission of the user and can unlock the own vehicle M with permission of the user.

Subsequently, the generator 440 determines whether a vehicle movement request is acquired because of a necessity to move the own vehicle M (step S211). When the generator 440 determines that the vehicle movement request is acquired, the generator 440 generates the operation instruction including the activation instruction to activate the system of the own vehicle M (step S213).

Subsequently, the generator 440 generates a movement route of the own vehicle M depending on a situation in which it is necessary to move the own vehicle M (step S215). Subsequently, the generator 440 generates the operation instruction including the traveling instruction including the generated movement route (step S217).

Subsequently, the generator 440 determines whether there is the generated operation instruction (step S219). When the generator 440 determines in step S211 that the vehicle movement request is not acquired, the generator 440 determines whether there is the generated operation instruction (step S219). When the generator 440 determines that there is the generated operation instruction, the generator 440 transmits the generated operation instruction to the own vehicle M (step S221). When the generator 440 determines that there is no generated operation instruction, the generator 440 causes the process to proceed to step S223 as it is.

Subsequently, the generator 440 determines whether the invalidation information transmitted by the own vehicle M is received (step S223). When the generator 440 determines that the invalidation information is not received, the process returns to step S205. When the generator 440 determines that the invalidation information is received, the generator 440 invalidates the received virtual key (step S225). Thereafter, the parking lot management device 400 ends the process shown in FIG. 8.

As described above, the virtual key control device 180 according to the embodiment issues the virtual key, transmits the virtual key to another device, for example, the parking lot management device 400, and sets the provisional authority for the other device to control the vehicle. Therefore, for example, when an inconvenience occurs in a parking lot or a vehicle during parking of the vehicle and control on movement or the like of the vehicle is requested, the vehicle can be controlled by the parking lot management device 400 even when a user is not located nearby. Accordingly, even when a user is not located nearby, an inconvenience occurring in the parking facility or the vehicle can be eliminated by setting the provisional authority.

In the foregoing embodiment, the other device is the parking lot management device 400, but the other device may be a device other than the parking lot management device, for example, a portable terminal device or the like owned by the user, a parking lot manager, a staff member, or the like. When the other device is a portable terminal device, a communicator may be a communication device using a Wi-Fi network or the like or may be a communication device that communicates with a vehicle through short-range communication such as near field communication (NFC). When the other device is a portable terminal device, a virtual key transmitted by the vehicle may be transmitted directly from the vehicle or may be transmitted via the parking lot management device or the like.

As a specific example, for example, when the other device is a portable terminal device owned by a staff member of a parking lot, the own vehicle M may transmit a virtual key to the parking lot management device 400 and the parking lot management device 400 may transmit the received virtual key to the portable terminal device. In this case, the staff member of the parking lot may control the own vehicle M using the portable terminal device. The communication between the parking lot management device 400 and the portable terminal device may be performed using a Wi-Fi network or the like may be performed using short-range communication.

As another specific example, for example, when the other device is a portable terminal device owned by the staff member of the parking lot, the own vehicle M may transmit a virtual key directly to the portable terminal device. In this case, the staff member of the parking lot may control the own vehicle M using the portable terminal device. The communication between the own vehicle M and the portable terminal device may be performed using a Wi-Fi network or the like or may be performed using short-range communication.

In the foregoing embodiment, when the virtual key is transmitted to the parking lot management device 400, the control on the own vehicle M performed by causing the parking lot management device 400 to transmit the virtual key use information is performed by controlling the automated driving control device 100 through the control of the virtual key control device 180, but may be performed in another manner. For example, the virtual key control device 180 may be able to directly control the traveling of the own vehicle M. For example, the staff member of the parking lot may perform manual driving regardless of control on the automated driving control device 100. When the staff member performs the manual driving, for example, information for activating the system of the own vehicle M may be transmitted to the travel driving power output device 200 directly by the virtual key control device 180 or through the automated driving control device 100 or the like so that the system of the own vehicle M is activated.

In the foregoing embodiment, when the permission information is not added to the virtual key, it is considered that the parking lot management device 400 cannot unlock the doors of the own vehicle M, but the parking lot management device 400 may enable the doors of the own vehicle M to be unlocked irrespective of presence or absence of the permission information. When the permission information is not added to the virtual key and the parking lot management device 400 is desired to unlock the doors of the own vehicle M, for example, the parking lot management device 400 may transmit permission request information to the portable terminal device owned by the user. In this case, when the user transmits permission information to the parking lot management device 400 in response to the permission request information, the parking lot management device 400 may be able to unlock the doors of the own vehicle M.

[Hardware Configuration]

Figure 9:
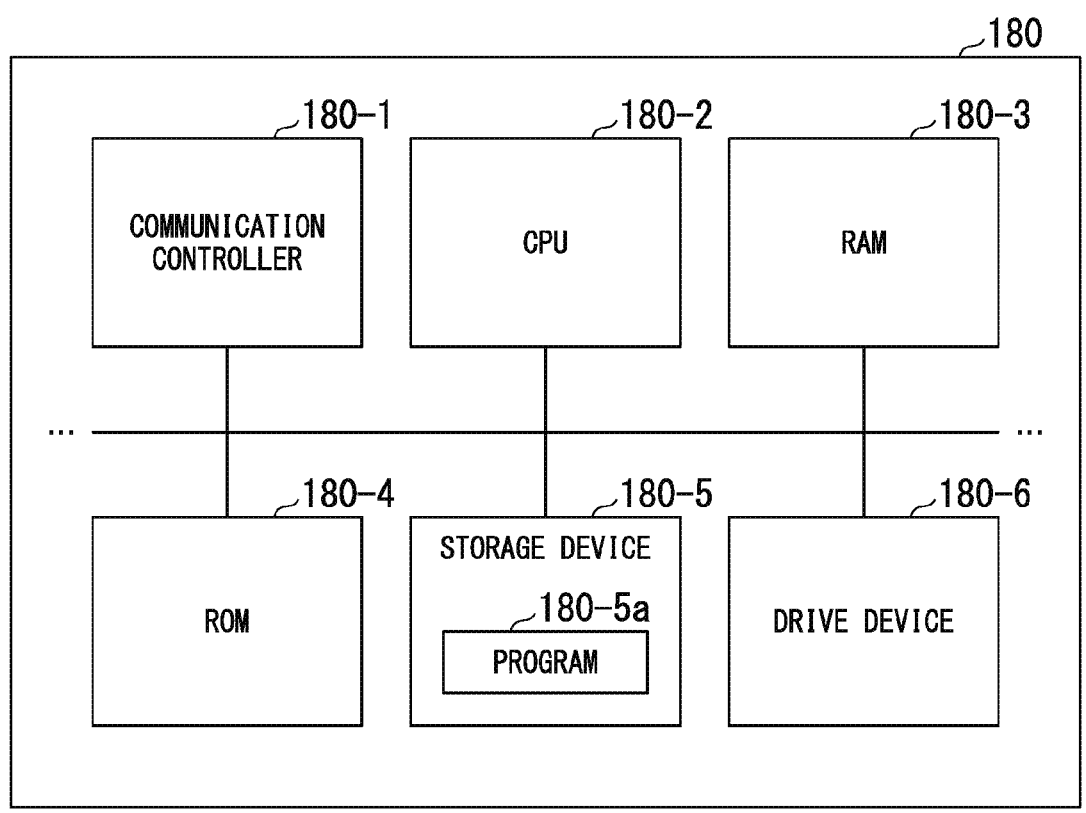
FIG. 9 is a diagram showing an example of a hardware configuration of the virtual key control device according to an embodiment.

FIG. 9 is a diagram showing an example of a hardware configuration of a virtual key control device 180 according to an embodiment. As shown, the virtual key control device 180 is configured such that a communication controller 180-1, a CPU 180-2, a random access memory (RAM) 180-3 that is used as a working memory, a read-only memory (ROM) 180-4 that stores a boot program or the like, a storage device 180-5 such as a flash memory or a hard disk drive (HDD), a drive device 180-6, and the like are connected to each other via an internal bus or a dedicated communication line. The communication controller 180-1 performs communication with constituent element other than the virtual key control device 180. The storage device 180-5 stores a program 180-5a that is executed by the CPU 180-2. The program is loaded on the RAM 180-3 by a direct memory access (DMA) controller (not shown) to be executed by the CPU 180-2. Thus, some or all of the key issuer 182, the key receiver 184, the operation recognizer 186, and the operation controller 188 are realized.

The above-described embodiment can be expressed as follows:

a vehicle control device including a storage device that stores a program and a hardware processor, the hardware processor executing the program stored in the storage device to perform:

communicating with another device and transmitting a virtual key enabling an operation on a vehicle within a range of a parking facility to the other device; and operating the vehicle based on operation information of the vehicle when use information of the virtual key is received.

The embodiments for carrying out the present invention have been described above, but the present invention is not limited to the embodiments. Various modifications and substitutions can be made within the scope of the present invention without departing from the gist of the present invention.

What is claimed is:

1. A vehicle control device comprising:
a processor; and
a memory storing program instructions executable by the processor to:
transmit a virtual key enabling an operation on a vehicle through automated valet parking control to another device by using a communicator for communicating with the another device;
operate the vehicle according to operation information of the vehicle in a case where the communicator receives use information of the virtual key;
invalidate the virtual key in a case where the vehicle leaves a parking facility according to a return instruction from a user of the vehicle;
adjust an operation of the vehicle according to a communication strength between the communicator and the another device;
cause the vehicle to perform a first operation in response to an operation on the vehicle in a case where the communication strength is equal to or greater than a first strength;
cause the vehicle to perform a second operation in which a control degree is lower than in the first operation in a case where the communication strength is less than the first strength and equal to or greater than a second strength; and
cause the vehicle to stop in a case where the communication strength is less than the second strength.

2. The vehicle control device according to claim 1, wherein the operation on the vehicle includes an operation of giving an instruction to activate a system of the vehicle and to cause the vehicle to travel.

3. The vehicle control device according to claim 1, wherein,
transmitting the virtual key comprises transmitting the virtual key to the another device after the vehicle enters the parking facility, and until the user of the vehicle alights from the vehicle.

4. The vehicle control device according to claim 1, wherein
the program instructions are further executable by the processor to:
invalidate the virtual key in a case where the vehicle parked in a parking space in the parking facility exits from the parking space according to an instruction from the user of the vehicle.

5. The vehicle control device according to claim 1, wherein
the program instructions are further executable by the processor to:

invalidate the virtual key in a case where the vehicle deviates from a communicable range of a communication device provided in the parking facility.

6. The vehicle control device according to claim 1, wherein
the operation on the vehicle includes an operation of giving an instruction to unlock a door of the vehicle according to permission of the user.

7. A vehicle control method using a computer, comprising:
transmitting a virtual key enabling an operation on a vehicle through automated valet parking control to another device by using a communicator communicating with the another device;
operating the vehicle according to operation information of the vehicle in a case where the communicator receives use information of the virtual key;
invalidating the virtual key in a case where the vehicle leaves a parking facility according to a return instruction from a user of the vehicle;
adjusting an operation of the vehicle according to a communication strength between the communicator and the another device;
causing the vehicle to perform a first operation in response to an operation on the vehicle in a case where the communication strength is equal to or greater than a first strength;
causing the vehicle to perform a second operation in which a control degree is lower than in the first operation in a case where the communication strength is less than the first strength and equal to or greater than a second strength; and
causing the vehicle to stop in a case where the communication strength is less than the second strength.

8. A computer-readable non-transitory storage medium that stores a program causing a computer to perform:
transmitting a virtual key enabling an operation on a vehicle through automated valet parking control to another device by using a communicator communicating with the another device;
operating the vehicle according to operation information of the vehicle in a case where the communicator receives use information of the virtual key;
invalidating the virtual key in a case where the vehicle leaves a parking facility according to a return instruction from a user of the vehicle;
adjusting an operation of the vehicle according to a communication strength between the communicator and the another device;
causing the vehicle to perform a first operation in response to an operation on the vehicle in a case where the communication strength is equal to or greater than a first strength;
causing the vehicle to perform a second operation in which a control degree is lower than in the first operation in a case where the communication strength is less than the first strength and equal to or greater than a second strength; and
causing the vehicle to stop in a case where the communication strength is less than the second strength.

* * * * *